Oct. 8, 1963 W. B. HARRIS, JR., ETAL 3,105,990
GLARE SHIELD FOR WINDSHIELD WIPER
Filed Dec. 6, 1962

WILLIAM B. HARRIS, JR.
ELIZABETH B. CHAMPION
INVENTOR.

BY

ATTORNEY

United States Patent Office 3,105,990
Patented Oct. 8, 1963

3,105,990
GLARE SHIELD FOR WINDSHIELD WIPER
William B. Harris, Jr., 1218 W. T. Waggoner Bldg., and Elizabeth B. Champion, 3557 Bellaire Drive S., both of Fort Worth, Tex.
Filed Dec. 6, 1962, Ser. No. 242,709
3 Claims. (Cl. 15—250.35)

This invention relates to a glare shield for a windshield wiper, and it concerns more particularly a non-reflecting, light absorbing sheath formed of molded elastic, resilient material for application to a swinging arm forming a portion of a windshield wiper assembly whereby a wiper blade portion thereof is supported for oscillating movement, said arm having light reflecting surfaces and said sheath providing a removable covering therefor substantially coextensive with its exposed surfaces.

A windshield wiper assembly of conventional design includes a wiper blade consisting essentially of a flexible blade element formed of molded rubber or like material and a rigid metal holder for the flexible blade element extending along one of its longitudinal edges, said holder having a length substantially coextensive with the length of said blade element.

The assembly further includes a swinging arm whereby the wiper blade is supported for oscillating movement, said holder being loosely and removably connected intermediate its ends to one end of said arm for universal pivotal movement relative thereto.

The swinging arm whereby the wiper blade is supported for oscillating movement, as above described, commonly is formed of metal having highly polished, light reflecting chromium or nickel plated surfaces which contribute substantially to the glare, particularly from reflected sunlight, to which the operator of a vehicle is subjected, with the attending discomfort.

This invention contemplates a non-reflecting, light absorbing sheath formed of molded elastic, resilient material for application to the swinging arm whereby the wiper blade is supported for oscillating movement, said teeth providing a removable cover for said arm substantially coextensive with its exposed surfaces.

The invention will be readily understood by referring to the following description and the accompanying drawing, in which.

Figure 2:
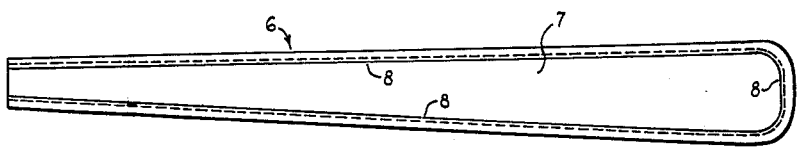
FIG. 2 is a longitudinal view of the glare shield on an enlarged scale showing one side thereof, and showing the longitudinal opening substantially coextensive with said one side for application of the glare shield to the swinging arm from one side thereof.
Figure 3:
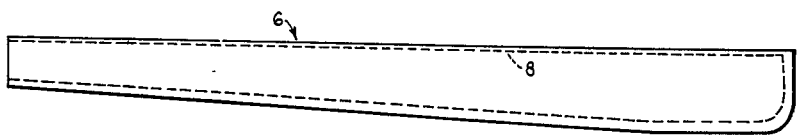
Figure 4:
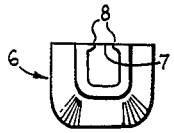

FIG. 3 is a longitudinal view taken at right angles to the view shown in FIG. 2, showing a side of the glare shield adjoining the side thereof shown in FIG. 2; and FIG. 4 is a transverse view taken from one end of the view shown in FIG. 2, showing the relatively smaller, open end of the glare shield, which is closed at one end and is tapered intermediate its ends whereby it is conformable to the swinging arm, and showing the marginal lip extending inwardly from opposite sides and from said closed end of the glare shield, and defining the longitudinal opening in said one side thereof, for yieldable engagement with the corresponding side of the swinging arm whereby the glare shield is removably secured thereto.

Figure 1:
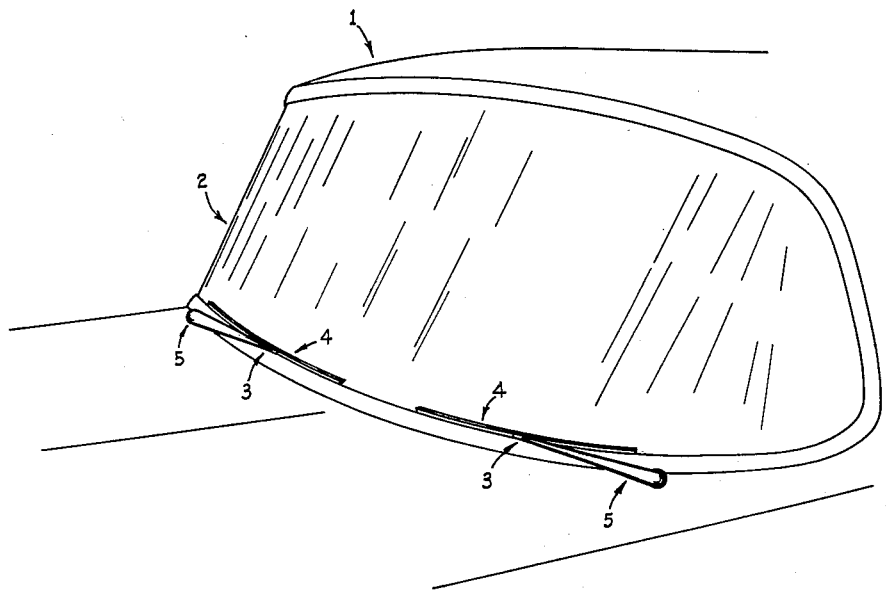
FIG. 1 is a fragmentary perspective view of an automobile showing the windshield and a pair of windshield wipers each having a glare shield embodying the invention applied to the swinging arm whereby the wiper blade thereof is supported for oscillating movement.

Referring to FIG. 1 of the drawing, the numeral 1 designates generally an automobile, which is shown fragmentarily, and the numeral 2 indicates generally the windshield thereof. A pair of windshield wipers, each indicated generally by the numeral 3, are operatively positioned relative to the windshield 2.

The windshield wipers 3 each include a wiper blade, indicated generally by the numeral 4, and a swinging arm, indicated generally by the numeral 5, whereby the wiper blade 4 is supported for oscillating movement. The swinging arms 5 each have applied thereto a glare shield embodying the invention, indicated generally by the numeral 6, one of which is shown in FIGS. 2, 3, and 4.

The glare shields 6 each comprise a non-reflecting, light absorbing sheath formed of molded elastic, resilient material for application to a swinging arm 5, said sheath providing a removable covering for the swinging arm 5 substantially coextensive with its exposed surfaces.

The molded element which comprises the glare shield 6 is of elongated, generally tubular structure, rectangular in transverse section, and tapered intermediate its ends, whereby it is conformable to a swinging arm 5, and is closed at one end and has a longitudinal opening 7 in one side thereof, substantially coextensive with said one side, for application of the glare shield 6 to the swinging arm 5 from one side thereof.

A flexible marginal lip 8, which extends inwardly from opposite sides of the glare shield 6 and from the closed end thereof, and defines the longitudinal opening 7, is yieldably engageable with the corresponding side of the swinging arm 5 whereby the glare shield 6 is removably secured thereto.

The invention may be modified in various ways without departing from the spirit and scope thereof.

We claim:
1. A glare shield for a windshield wiper comprising a non-reflecting, light absorbing sheath formed of molded elastic, resilient material for application to a swinging arm forming a portion of a windshield wiper assembly whereby a wiper blade portion thereof is supported for oscillating movement, said arm having light reflecting surfaces and said sheath providing a removable covering therefor substantially coextensive with its exposed surfaces.

2. In combination with a windshield wiper having a wiper blade and having a swinging arm whereby the wiper blade is supported for oscillating movement, said arm having light reflecting surfaces, the combination of a glare shield comprising a non-reflecting, light absorbing sheath formed of molded elastic, resilient material received on said arm and providing a removable covering therefor substantially coextensive with its exposed surfaces.

3. The structure of claim 2, the molded element comprising the glare shield being of elongated, generally tubular structure conformable to said arm, and being closed at one end and having a longitudinal opening in one side thereof, substantially coextensive with said one side, for application of the glare shield to said arm from one side thereof, and having a flexible marginal lip extending inwardly from opposite sides of the glare shield and from the closed end thereof, and defining said longitudinal opening, in yieldable engagement with the corresponding side of said arm whereby the glare shield is removably secured thereto.

References Cited in the file of this patent
UNITED STATES PATENTS
2,639,641    Piwczynski _____ May 26, 1953
FOREIGN PATENTS
1,087,482    Germany _____ Aug. 18, 1960